No. 688,263. Patented Dec. 3, 1901.
R. W. PERRY.
BACK PEDALING BRAKE.
(Application filed Oct. 27, 1900.)
(No Model.)
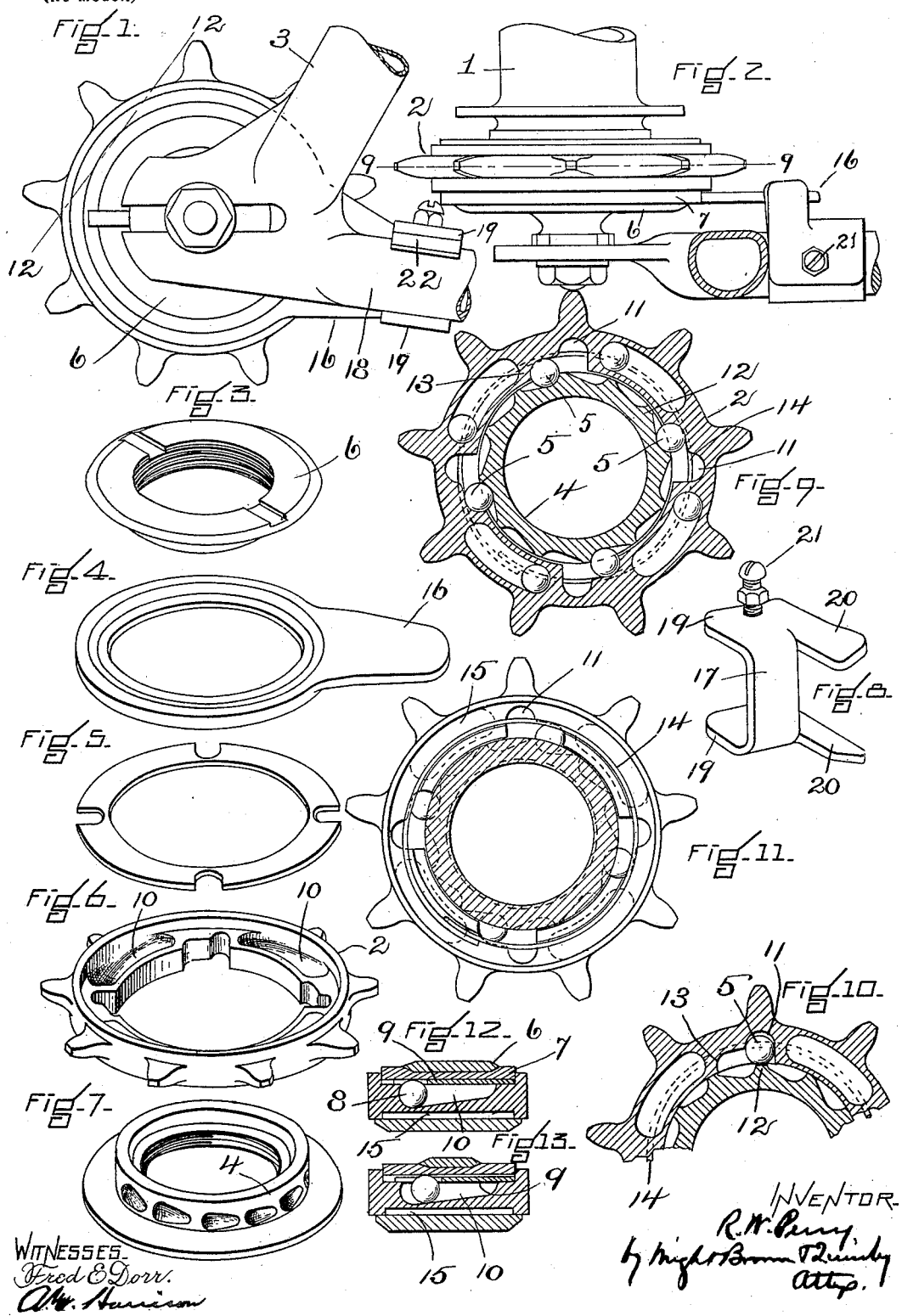

UNITED STATES PATENT OFFICE.

REUBEN W. PERRY, OF WALTHAM, MASSACHUSETTS.

BACK-PEDALING BRAKE.

SPECIFICATION forming part of Letters Patent No. 688,263, dated December 3, 1901.

Application filed October 27, 1900. Serial No. 34,591. (No model.)

*To all whom it may concern:*

Be it known that I, REUBEN W. PERRY, of Waltham, in the county of Middlesex and State of Massachusetts, have invented certain new and useful Improvements in Back-Pedaling Brakes, of which the following is a specification.

This invention relates to bicycle driving devices of the free-wheel or coaster-brake variety.

Its object is to provide improvements in the driving-clutch mechanism of such devices, whereby a single spring may be utilized in projecting a series of locking-balls into locking position.

A further object of the invention is to provide an improved clip for attaching the non-rotatable brake member to the bicycle-frame.

The invention consists in the novel features of construction and arrangement which I shall now proceed to describe and claim.

Of the accompanying drawings, Figure 1 represents an end elevation of a hub and a portion of a frame, showing the attaching-clip. Fig. 2 represents a top plan view thereof with part of the frame in section. Figs. 3 to 7, inclusive, represent detail perspective views of parts of the brake and clutch mechanisms. Fig. 8 represents a perspective view of the clip. Fig. 9 represents a section on the line 9 9 of Fig. 2. Fig. 10 represents a partial transverse section similar to Fig. 8, showing the clutch parts in a different relative position. Fig. 11 represents a sectional view showing the inner side of the sprocket in elevation. Fig. 12 represents a section on the line 12 12 of Fig. 1 with the brake free. Fig. 13 represents a view similar to Fig. 12 with the brake set.

The same reference characters indicate the same parts in all the figures.

Referring to the drawings, 1 represents the rear-wheel hub, 2 represents the sprocket mounted thereon, and 3 represents the bicycle-frame. The inner portion of the sprocket 2 constitutes the outer one of the two driving-clutch members, and the inner member consists of a toothed or recessed collar 4, screwed fast upon the hub 1. Between the sprocket 2 and clutch member 4 operate a series of balls 5 5, which constitute locking-dogs to lock the sprocket and hub together when the sprocket is rotated in a driving direction relatively to the hub.

6 is a brake-disk screwed to the outer end of the hub 1, and 7 is a disk held from rotation by attachment to the frame and located between sprocket 2 and brake-disk 6.

8 8 are a series of spherical rollers or balls operating between the non-rotating disk 7 and a series of inclines 10 10 on the outer face of sprocket 2.

9 is a notched retainer for the balls 8, located between sprocket 2 and disk 7.

A cessation of pedaling on the part of the rider allows the hub 1 and clutch member 4 to rotate loosely within the sprocket 2. Back-pedaling moves the balls 8 8 up the inclines 10 10 and forces the non-rotatable brake-disk 7 against the rotating brake-disk 6 and tends to brake or arrest the movement of the rear wheel. When the hub rotates freely within the sprocket, the balls 5 5 are forced outwardly into pockets 11 11, formed in the sprocket 2. When the driving or clutching action takes place, the balls 5 are held between the teeth 12 12 of the clutch member 4 and abutments 13 13 on the sprocket, thus giving a positive locking action. To insure the projection of the balls 5 into locking position, I provide a spring made in the form of a split annular ring 14, which is lodged in a recess 15 on the inner face of sprocket 2 and presses simultaneously inward on all of the series of balls or locking-dogs 5. This makes a simple and cheap construction and one not liable to derangement and not subject to much wear. This spring, which bears yieldingly against the locking devices or balls in a direction away from the bottoms of the pockets, has a particular utility in connection with the type of clutch shown, in which the balls or locking devices are positively engaged between two somewhat abrupt surfaces, as the teeth 12 and abutments 13, as distinguished from that type of clutch in which the balls are clamped either between two inclined surfaces or one inclined surface and another which is not inclined. The last-mentioned type of clutch is objectionable for the reason that the inclined surface is liable to become pitted or indented by the pressure against the ball, which cannot occur with the two opposing abutments or teeth of the type of clutch which I have illustrated. On the other hand, with this type illustrated there is a liability sometimes of the balls or lock devices failing to lock because of being held out in the pockets by the action of centrifugal force. The action of the spring 14 overcomes centrifugal force and insures the locking of the balls, as hereinbefore described.

In Figs. 1, 2, and 8 I show an improved form of clip for attaching the non-rotatable brake member to the bicycle-frame. 16 is an arm formed on the brake-disk 7, and 17 is a clip fastened to the frame-bar 18. The clip 17 is shown as made of a single piece of metal, bent to form two frame-embracing jaws 19 19 and two inwardly-projecting jaws 20 20, which embrace the end of arm 16. The clip is attached to the frame-bar by means of a set-screw 21, screwed through its upper jaw and bearing against a shoe 22, which is curved to fit the frame-bar 18. The rear wheel and brake attachment may be withdrawn without disturbing the clip 17, and the latter may be adjusted or removed without disturbing the wheel.

I do not herein claim the combination, with the frame and rear wheel, of a brake having a non-rotatable brake member provided with an arm and a clip fast to the frame and separably engaged with said arm; nor do I claim herein a clip for rear-wheel brakes comprising means for attachment to the frame-tube and a pair of jaws adapted to embrace an arm of a brake member. The invention above disclaimed, so far as this application is concerned, is shown and claimed in another application filed by me concurrently herewith and having the Serial No. 34,590.

I claim—

An automatic driving-clutch comprising two relatively rotatable clutch members one of said members having pockets and abutments independent of the walls of the said pockets and the other member having teeth or projections facing in a direction opposite said abutments, a series of independently-movable locking devices, adapted to be positively locked between said abutment and teeth, and a single spring bearing yieldingly against said locking devices in a direction away from the bottoms of the pockets.

In testimony whereof I have affixed my signature in presence of two witnesses.

REUBEN W. PERRY.

Witnesses:
C. F. BROWN,
E. BATCHELDER.